Oct. 20, 1970 E. E. DAVIDSON 3,535,529
SENSITIVE LIGHT SENSOR BIASED INTO THE AVALANCHE
MODE BY MEANS OF A PLURALITY OF CURRENT SOURCES
Filed Jan. 31, 1968

INVENTOR
E. E. DAVIDSON
BY G. E. Hirsch Jr.
ATTORNEY

United States Patent Office 3,535,529
Patented Oct. 20, 1970

3,535,529
SENSITIVE LIGHT SENSOR BIASED INTO THE AVALANCHE MODE BY MEANS OF A PLURALITY OF CURRENT SOURCES

Evan E. Davidson, Downers Grove, Ill., assignor to Bell Telephone Laboratories, Incorporated, Murray Hill, N.J., a corporation of New York Filed Jan. 31, 1968, Ser. No. 701,996
Int. Cl. H01j *39/12;* H01k *3/26, 3/42*
U.S. Cl. 250—211 3 Claims

ABSTRACT OF THE DISCLOSURE

Low level light signals are simultaneously detected and amplified by use of a phototransistor operating in the avalanche mode. Response of the phototransistor to the light signals is enhanced by biasing the phototransistor to operate at a predetermined collector current other than cut-off. A constant "negative" base current is generated by reverse biasing a diode in the phototransistor base circuit. The predetermined collector current is obtained by use of a constant current source in the phototransistor emitter circuit.

This invention relates to photodetector circuits and more particularly to a sensitive light activated switching circuit.

BACKGROUND OF THE INVENTION

Conventional photodetector circuits may utilize either a phototransistor or a photodiode.

The phototransistor circuits typically may be either of two configurations, namely, open base or controlled base. In the open base configuration, amplifier action is achieved by radiating light upon the base electrode. The controlled base phototransistor circuit functions essentially the same as a typical transistor amplifier except that the input signal is introduced by radiating light upon the base. Intensity of the light determines the magnitude of the input base current. The magnitude of the output is thus determined by the current gain of the transistor as in conventional circuits. Although such phototransistor circuits are adequate for some applications, they are unsatisfactory in others because of their relatively low gain and slow response.

Photodetector circuits which utilize photodiodes may also be of two types, for example, either a conventional photodiode circuit or an avalanche photodiode circuit. The conventional photodiode operates essentially the same as the open base phototransistor. It is therefore unsatisfactory for certain applications because of its low gain and slow response to applied signals. The avalanche photodiode may be utilized as a very sensitive photodetector because of high gain and rapid response achieved by operating in the avalanche mode. Although the avalanche photodiode is adequate for specific applications, it is inadequate in others, especially those in which many photodetectors are to be utilized. This is mainly due to instabilities caused by variations in the breakdown voltages of the individual photodiodes. Moreover, because of these variations it is very difficult, if at all possible, to bias properly a large number of diodes from a common bias supply.

SUMMARY OF THE INVENTION

It is therefore an object of this invention to detect low level light signals.

It is another object of this invention to reduce substantially the response time of a light detector to input signals.

It is yet another object of this invention to generate rapidly a signal of sufficient magnitude to obviate the need of additonal stages of amplification.

It is a further object of this invention to achieve sufficient stability in a light detector circuit that large numbers of these circuits may be biased from a common bias source.

Thus, problems in the prior art are overcome according to this invention by use of an extremely sensitive, stable photodetector which responds rapidly to low level light signals. This is accomplished by turning to account the avalanche mode characteristics of the phototransistor.

In one embodiment of the invention, a photodetector comprises a phototransistor biased to operate in the avalanche region. This region is established by supplying a negative current to the phototransistor base electrode and applying a collector-emitter potential sufficiently large to bias the collector base junction into the avalanche region. That is, a potential is applied which is greater than $BV_{CEO}$ (maximum reverse bias between collector and emitter with open base).

In operation, the phototransistor is normally biased at a selected negative base current and is usually cut off. Low level radiant energy from a light source is applied to trigger the photodetector. By applying light to the phototransistor base at a level sufficient to generate a given positive base current, the phototransistor is caused to switch from a cut-off or first mode of operation to a latched or second mode of operation. Thus, a change of state is effected which is analogous to a change from the 0 to the 1 state of a logic element. The phototransistor remains in the latched mode of operation until the collector current is reduced to a sufficiently low level to allow the transistor to return to cutoff.

The switching action, in response to radiant energy, is somewhat delayed because of the time required for charging the base-emitter capacitance of the phototransistor. The response time is improved, in accordance with the invention, by biasing the phototransistor at a stable operating condition, which is at a positive collector current instead of at cutoff, thereby eliminating the necessity of initially charging the base-emitter capacitance. In this instance, the momentary operating condition of the phototransistor is switched in response to the application of light to the phototransistor base and is returned to its stable operating condition when the light is removed.

Thus, a feature of the invention is the use of a single phototransistor to obtain high gain, rapid response, and good stability, thereby minimizing circuit complexity and allowing many stages to be biased in common from the same source.

These and other objects and advantages of the invention will be more fully understood from the following detailed description of an illustrative embodiment thereof taken in connection with the appended drawings.

DETAILED DESCRIPTIION OF THE INVENTION

Figure 1:
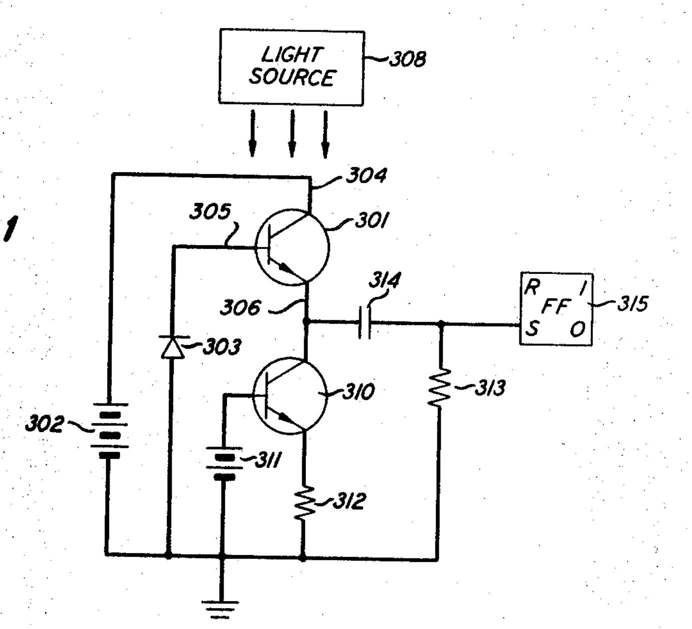
FIG. 1 is a schematic presentation of a phototransistor circuit that illustrates the invention.

FIG. 1 illustrates a circuit which may be utilized in the practice of the invention. The circuit includes phototransistor 301, for example an N-P-N device, which is biased to operate in the avalanche mode. The avalanche mode or region of operation is usually defined as that region in which the collector-emitter voltage is greater than $BV_{CEO}$ (maximum reverse bias between collector and emitter with open base) for a common emitter configuration. In this region the rapid multiplication of current gain caused by avalanche creates the desired high current gain and fast response. The avalanche mode of operation of transistors is more thoroughly explained by J. Millman and H. Taub in Pulse, Digital, and Switching Waveforms, McGraw-Hill, 1965.

Operation in the avalanche mode is established, in accordance with the invention, by applying a potential of sufficient magnitude from source 302 to collector electrode 304 of phototransistor 301. A negative base current, which enables phototransistor 301 to be biased into the avalanche region, may be supplied by any of a number of means, for example, by reverse biasing diode 303 with a potential of sufficient magnitude The reverse biasing of diode 303 is explained later in conjunction with the phototransistor emitter constant current source. Diode 303 is selected to supply negative current to base electrode 305 because, when reverse biased, it performs as an ideal constant current source which is independent of variations in the reverse bias potential.

Additionally, to enhance its switching response, phototransistor 301 is biased to a stable operating point at a given collector current level. This is achieved, in accordance with the invention, by application of a constant emitter current to transistor 301. The emitter current, which may be of any desired magnitude, is supplied by transistor 310, e.g., an N-P-N device. The emitter current level is determined by the magnitude of the potential supplied to the base electrode of transistor 310 by source 311 and the value of resistor 312 which is connected to the emitter of transistor 310. Diode 303 is reverse biased by the potential level developed across transistor 310 at emitter electrode 306 of phototransistor 301, thereby generating a constant reverse base current which is utilized to bias phototransistor 301 into the avalanche region. As base 305 of transistor 301 is illuminated, e.g., by light from source 308, a signal is developed by avalanche multiplication at emitter 306 of device 301 which is coupled to load resistor 313 by capacitor 314. The potential developed across resistor 313 may be utilized as desired. For example, it may be employed to set flip flop 315.

Figure 2:
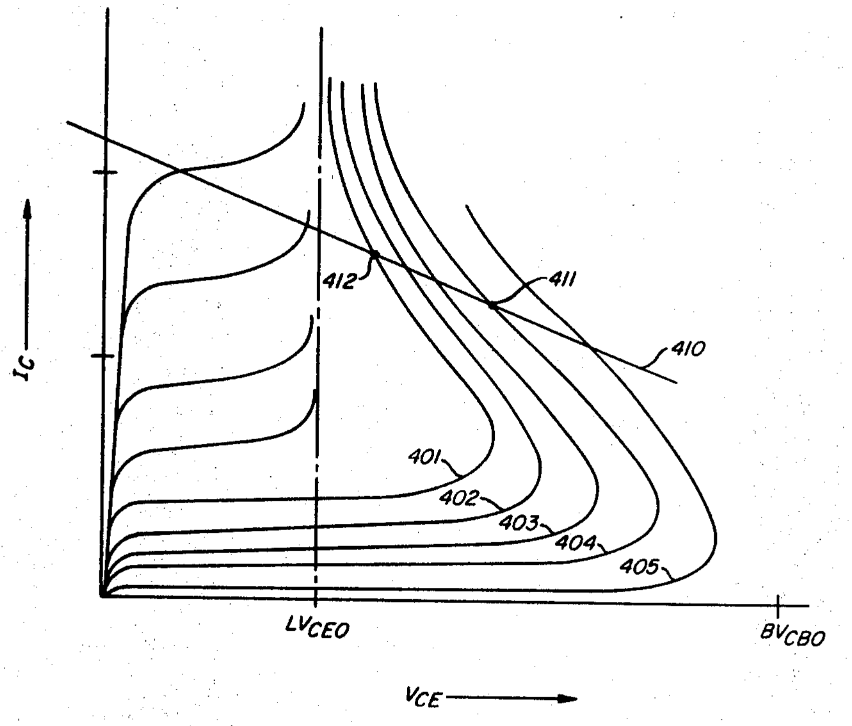
FIG. 2 illustrates the operation of the circuit of FIG. 1 on a simplified set of phototransistor-collector characteristics.

The operation of the circuit of FIG. 1 is diagrammatically shown on the collector characteristics of FIG. 2. Shown are collector current versus collector-emitter voltage for negative base currents 401 through 405 and positive base currents, not numbered. Phototransistor 301 (FIG. 1) is normally biased to operate at a stable point, for example, at 411 (FIG. 2), when no light impinges upon its base electrode. In practice, point 411 may represent a reverse base current of 10 nanoamperes and a collector-to-emitter breakdown potential of 95 volts. When the base electrode of phototransistor 301 is illuminated, with light of sufficient magnitude (approximately 10 nanowatts), the detector circuit output rapidly switches because of avalanche multiplication from operation at point 411 to some other point, for example 412 on the A.C. load line 410. The slope of the load line is determined primarily by the value of resistor 313 (FIG. 1). The magnitude of the change in output potential is determined by the intensity of the light reaching the base electrode of phototransistor 301. Typically, point 412 (FIG. 2) represents a collector-to-emitter potential of approximately 60 volts. Thus, a substantial change of potential is developed at emitter 306 in response to a relatively small change in base current (in the order of 5 nanoamperes), which is coupled to flip-flop 315 via capacitor 314 and load resistor 313. Phototransistor 301 may, if desired, be driven into the positive base current region. When the light from source 308 is extinguished, the circuit returns to stable point 411. There is no latching effect as in the instance of biasing phototransistor 301 to cut-off rather than operating it at a stable collector current. This is due to the emitter constant current source forcing phototransistor 301 to operate at point 411.

Additionally, it is to be understood that the above-described arrangements are only illustrative of the application of the principles of this invention. Numerous other arrangements may be devised by those skilled in the art without departing from the spirit and scope of the invention.

What is claimed is:

1. A sensitive light detector which comprises in combination:

a phototransistor having base, emitter and collector electrodes;

means for biasing said phototransistor which includes, a source for applying a potential to said collector electrode, said potential having a given reference polarity and sufficient magnitude to bias the collector-base junction of said phototransistor into an avalanche region, and a first current source for supplying a substantially constant current to said base electrode, said base current having a polarity opposite to said reference polarity;

a second current source serially connected in circuit relationship with the emitter electrode of said phototransistor and a reference potential point for establishing a stable collector operating current other than cutoff for said phototransistor;

output network means connected in circuit relationship with the emitter electrode of said phototransistor; and a source of radiant energy selectively applied to the base of said phototransistor for altering the magnitude of collector current flowing through said phototransistor from said stable current value to another collector operating current value.

2. A light detector as defined in claim 1 wherein said first current source includes a diode poled such that said base current is generated when said diode is reverse biased, said diode being connected in circuit between the base electrode of said phototransistor and said reference potential point.

3. A light detector as defined in claim 2 wherein said second current source includes:

a transistor having base, emitter and collector electrodes, the collector electrode of said transistor being connected to the emitter electrode of said phototransistor, a resistor serially connected between the emitter electrode of said transistor and said reference potential point, and a source of potential connected between the base electrode of said transistor and said reference potential point for forward biasing said transistor, wherein the magnitude of the potential supplied by said base potential source and the value of the resistance of said emitter resistor establish said stable collector current operating condition of said phototransistor and wherein said diode is reverse biased by a potential developed at the emitter electrode of said phototransistor in response to said stable collector current flowing through said transistor.

References Cited

UNITED STATES PATENTS

| | | | |
|---|---|---|---|
| 2,790,034 | 4/1957 | McAfee | 307—302 X |
| 2,812,445 | 11/1957 | Anderson | 307—278 X |
| 2,889,499 | 6/1959 | Rutz | 317—235 |
| 2,921,206 | 1/1960 | Kidd | 307—283 X |
| 2,923,836 | 2/1960 | Richards et al. | 307—278 |
| 3,114,056 | 12/1963 | Berge | 307—283 |

OTHER REFERENCES

Handbook of Semiconductor Electronics, edited by Lloyd P. Hunter, second edition, 1962, McGraw Hill, pp. 17–23, 19–8, and 19–9 relied upon.

WALTER STOLWEIN, Primary Examiner

T. N. GRIGSBY, Assistant Examiner

U.S. Cl. X.R.

250—214; 307—283, 311